United States Patent
Maitin (10) Patent No.: US 7,591,422 B2
(45) Date of Patent: Sep. 22, 2009

(54) TECHNIQUES TO REDUCE FALSE ALARMS, INVALID SECURITY DEACTIVATION, AND INTERNAL THEFT

(75) Inventor: Steven R. Maitin, Lake Worth, FL (US)

(73) Assignee: Sensormatic Electronic Corporation, Boca Raton, FL (US)

( * ) Notice: Subject to any disclaimer, the term of this patent is extended or adjusted under 35 U.S.C. 154(b) by 472 days.

(21) Appl. No.: 11/055,293

(22) Filed: Feb. 10, 2005

(65) Prior Publication Data

US 2006/0175402 A1 Aug. 10, 2006

(51) Int. Cl.
*G06K 15/00* (2006.01)

(52) U.S. Cl. .......................... 235/383; 235/385; 705/16; 340/572.1

(58) Field of Classification Search ................. 235/383, 235/385; 705/16; 340/572.1
See application file for complete search history.

(56) References Cited

U.S. PATENT DOCUMENTS

| | | | |
|---|---|---|---|
| 5,600,304 A * | 2/1997 | Accolla et al. ............ 340/572.1 |
| 6,222,452 B1 * | 4/2001 | Ahlstrom et al. .......... 340/572.1 |
| 6,354,497 B1 * | 3/2002 | Lippert et al. ............... 235/383 |
| 6,517,000 B1 | 2/2003 | McAllister et al. |
| 7,132,947 B2 * | 11/2006 | Clifford et al. ........... 340/572.3 |
| 2003/0057276 A1 * | 3/2003 | Appalucci et al. .......... 235/382 |

FOREIGN PATENT DOCUMENTS

WO WO03/067538 A2 * 8/2003

* cited by examiner

*Primary Examiner*—Seung H Lee
(74) *Attorney, Agent, or Firm*—Kacvinsky LLC (57) ABSTRACT

A system, apparatus, method and article to eliminate false alarms, invalid security deactivation, and internal theft are described. The apparatus may include a first input to receive a first identification code associated with an item, a second input to receive a second identification code associated with the item, and an output to provide a control signal to control the operation of a security label deactivation and detection device based on the first and second identification codes. Other embodiments are described and claimed.

12 Claims, 6 Drawing Sheets

TECHNIQUES TO REDUCE FALSE ALARMS, INVALID SECURITY DEACTIVATION, AND INTERNAL THEFT

BACKGROUND

Electronic article surveillance (EAS) systems are used to control inventory and to prevent theft or unauthorized removal of items tagged with an EAS security label from a controlled area. Such systems may include a system transmitter and a system receiver to establish a surveillance zone (typically entrances and/or exits in retail stores). The surveillance zone is set-up such that an item removed from or brought into the controlled area must traverse the surveillance zone.

An EAS security label is affixed to the controlled item, including, for example, an article of merchandise, product, case, pallet, container, and the like. The label includes a marker or sensor adapted to interact with a first signal that the system transmitter transmits into the surveillance zone. This interaction establishes a second signal in the surveillance zone. The system receiver receives the second signal. If an item tagged with an EAS security label traverses the surveillance zone, the system recognizes the second signal as an unauthorized presence of the item in the controlled area and activates an alarm.

DETAILED DESCRIPTION

Figure 1:
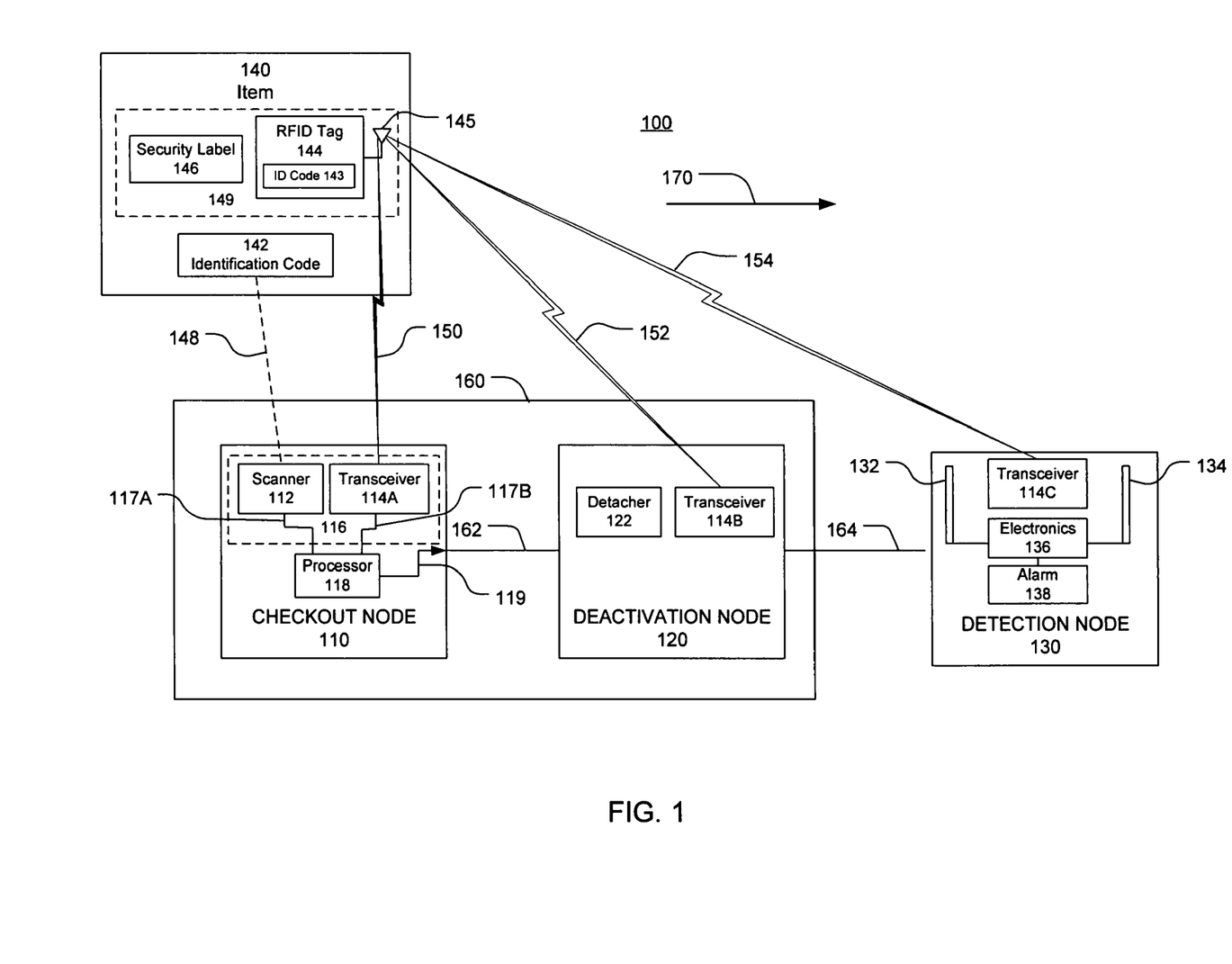
FIG. 1 illustrates a first block diagram of a system in accordance with one embodiment.

FIG. 1 illustrates a block diagram of a system 100. System 100 may comprise, for example, a communication system having multiple nodes. A node may comprise any physical or logical entity having an address in system 100. Examples of a node may comprise a checkout device, scanner, transceiver, RFID transceiver, deactivator, detector, articles of merchandise comprising an identification code, RFID tag, security label, computer, server, workstation, laptop, ultra-laptop, handheld computer, telephone, cellular telephone, personal digital assistant (PDA), router, switch, bridge, hub, gateway and so forth. The address may comprise, for example, a network address such as an Internet Protocol (IP) address, a device address such as a Media Access Control (MAC) address, and so forth. The embodiments are not limited in this context.

System 100 nodes may be arranged to communicate different types of information, such as media information and control information. Media information may refer in a very general sense to any data representing content, such as bar code information, RFID information, security label information, voice information, video information, audio information, text information, numerical and alphanumerical information, alphanumeric symbols, graphics, images, symbols, and so forth. Control information also may refer to in a very general sense to any data representing commands, instructions or control words meant for an automated system. For example, control information may be used to interrogate bar codes, RFID tags, security labels, identify RFID tags, route media information through a system, or instruct a node to process the media information in a certain manner. The embodiments are not limited in this context.

System 100 nodes may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. The embodiments are not limited in this context.

Embodiments of system 100 may comprise a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, embodiments of system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The communications media connect to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, embodiments of system 100 may include one or more wireless nodes arranged to communicate information over one or more types of wireless communication media, sometimes referred to herein as wireless shared media. An example of a wireless communication media may include portions of a wireless spectrum, such as the radio-frequency (RF) spectrum. The wireless nodes may include components and interfaces suitable for communicating information signals over the designated wireless spectrum, such as one or more antennas, wireless transmitters/receivers ("transceivers"), amplifiers, filters, control logic, and so forth. As used herein, the term "transceiver" may include, in a very general sense, a transmitter, a receiver, or a combination of both. Examples of an antenna may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. The embodiments are not limited in this context.

Referring again to FIG. 1, system 100 may comprise one or more nodes 110, 120, 130, for example, to read and process information contained in article of merchandise 140. System 100 may process transactions associated with article of merchandise 140 along a general checkout flow path indicated by arrow 170. Although FIG. 1 shows a limited number of nodes arranged in a certain topology, system 100 may include additional or fewer nodes arranged in a variety of topologies in accordance with a given embodiment. The embodiments are not limited in this context.

Article of merchandise 140 may comprise, for example, any product, food, drug, component, case, container, pallet, coupon, ticket, label or other medium, and any other tracked or controlled item. Article of merchandise 140 may comprise first item identification code 142, RFID tag 144, and security label 146 affixed thereto. In addition, RFID tag 144 may comprise second item identification code 143 and antenna 145. Security label 146 may comprise an EAS label, for example. In one embodiment, RFID tag 144 and security label 146 may be an integral unit 149 or they may be separate elements, for example.

First item identification code 142 may comprise, for example, a product identification code associated with article of merchandise 140. In one embodiment, first item identification code 142 may comprise, for example, a bar code. First item identification code 142 may be printed, stamped, or otherwise affixed to article of merchandise 140. First item identification code 142 may comprise encoded numeric or alphanumeric data elements associated with article of merchandise 140 and may comprise, for example, a system number, a manufacture number to identify the manufacturer, and an item code to identify the article, among others. Each data element may comprise one or more digits. First item identification code 142 also may comprise information to check the code when transferred to a separate device, for example.

In one embodiment, first item identification code 142 may comprise a bar code, for example. A bar code is a symbol of the Universal Product Code (UPC). The bar code facilitates timely and accurate input of data to a computer system and enables the grocery and retail industry to track, manage, and control physical product flow (e.g., article of merchandise 140). A scanner/bar-code reader located at a checkout counter reads the bar code when placed in proximity thereto and in line of sight therewith. Bar code data elements comprise a series of alternating bars and spaces forming a pattern of varying-width parallel bars and spaces. The combination of these parallel lines of bars and spaces encode data about the item, product, container, media, and the like. Applications of the bar code include inventory control and check out scanning. Bar code standards may include, for example, the Universal Product Code-A standard, which is widely used by retailers in the U.S. and Canada, and the newer Code 128 (e.g., UCC/EAN128), among others.

Each bar code may comprise, for example, a system number, a manufacture number, and an item code, among others. The numeric or alphanumeric code may be used to identify a specific product, and generally may comprise a six-digit code to identify the manufacturer, a six-digit code used by the manufacturer to identify the product, and a two-digit check code to verify accurate transmission of the bar code to the scanner. The U.S. grocery industry has adopted a 12-digit bar code pattern to identify a number system character (type of encoded product), a five-digit manufacturer number assigned by the UCC, a five-digit product code assigned by the manufacturer, and a modulo 10 check digit as the $12^{th}$ character. There are two versions of this numeric code including a version E that contains six digits and a version D that contains 12+n-digits.

RFID tag 144 may comprise an integrated circuit (IC) and a second item identification code 143. In addition, RFID tag 144 may comprise antenna 145 connected thereto. RFID tag 144 may comprise a variety of chip architectures and second item identification code 143 may comprise a variety of code formats. RFID tag 144 is operable to respond to an interrogating RF signal, which includes some identification information. A code format used in the retail industry is the Electronic Product Code (EPC), for example. The EPC is a globally unique number that identifies a specific item in a supply chain and is stored in RFID tag 144. The EPC uses a 96-bit scheme advocated by EPC global. Other code formats and techniques may be used. For example, larger or more compact 64-bit codes may be useful depending on the particular embodiment. These coding schemes are capable of uniquely identifying trillions of objects and provide more information about items than cannot be provided using bar codes alone, for example. Certain enterprises or retailers mandate specific RFID systems in accordance with the EPC specification, for example. This specification describes five main components of an RFID system: the EPC, tags, readers, middleware, and the information service.

Several aspects of RFID technology differentiate it from bar code technology. For example, second item identification code 143 stored in RFID tag 140 is transmitted by radio waves and does not require line of sight scanning to transfer data. It allows virtually simultaneous and instantaneous reading of multiple tags near RFID transceiver 114A. In addition, each RFID tag 144 may include a unique code that ultimately allows individual identification and accounting of every tagged item. Retailers may use RFID technology to associate the unique RFID identifiers, such as second item identification code 143, with other information of interest from fields in a database that pertains to various items and articles of merchandise comprising RFID tag 144. In one embodiment, second item identification code 143 may be associated, or correlated, with first item identification code 142 to determine whether item of merchandise 140 identified by second item identification code 143 is the same item according to the first item identification code 142.

Second item identification code 143 may comprise, for example, an RFID identification code associated with article of merchandise 140. Second item identification code 143 may comprise specific product details associated with article of merchandise 140 for processing by system 100. Second identification code 143 may comprise, for example: date of manufacture, time spent in transit, location of distribution center holding the item, name of the last person to handle the item, amount for which the item was sold, payment method used in buying the item, expiration date, last date of service, warranty period, and security label, among others. Second item identification code 143 may provide additional information about article of merchandise 140 and additional functionality over first item identification code 142. For example, second item identification code 143 includes more data and system 100 may change the data during processing. First and second item identification codes 142, 143 may be correlated by system 100 to determine whether item of merchandise 140 identified by first item identification code 142 is the same item identified by second item identification code 143.

Checkout node 110 may comprise scanner 112 and transceiver 114A, each connected to processor 118. Checkout node 110 may be adapted to process various transactions including processing purchases of various items, such as article of merchandise 140, for example. Checkout node 110 may communicate with article of merchandise 140 through wireless connections 148 and 150, for example. In one embodiment, connection 148 may be an optical connection and connection 150 may be an RF wireless connection.

Checkout node 110 is connected to deactivation node 120 through connection 162. Deactivation node 120 is connected to detection 130 through connection 164. Connections 162 and 164 may be wired or wireless connections, for example.

Scanner 112 may comprise, for example, a checkout device. Examples of a checkout device may include an apparatus to process or register a purchase of item of merchandise 140, such as a cash register, a point-of-sale (POS) terminal, a scanner, and the like, installed at a checkout counter in a retail facility. In one embodiment, scanner 112 may comprise an optical device such as a laser device, for example. Embodiments of scanner 112 may comprise in-counter scanners, wands, hand-held devices, projection/vertical scanners, for example. Scanner 112 may be adapted to read information from article of merchandise 140. For example, scanner 112 may be adapted to read information.

In operation, scanner 112, such as for example a POS scanner, reads first item identification code 142 over channel 148. The embodiments are not limited in this context. Accordingly, channel 148 may be an optical link and the scanner 112 is a laser scanner adapted to read code 142. In one embodiment, first item identification code 142 is bar code information.

In one embodiment, transceiver 114A and RFID tag 144 may form an RFID system and communicate with each other over wireless RF communication channel 150. In one embodiment, transceiver 114A may comprise a hardware device to interrogate RFID tag 144 and initiate reading second item identification code 143. In one embodiment, transceiver 114A may comprise an RFID transceiver adapted to communicate (e.g., read and write) information with RFID tag 144. In operation, transceiver 114A sends a request for identification information 143 to RFID tag 144 over wireless RF communication channel 150. RFID tag 144 responds by transmitting the second identification information 143 to transceiver 114A, which then provides the information to processor 118, for example. Once interrogated by transceiver 114A, RFID tag 144 transmits second item identification code 143 by way of RF communication channel 150 through antenna 145. In one embodiment, transceiver 114A is located at checkout node 110. In other embodiments, transceiver 114A may be located remotely from checkout node 110 and may be mounted in doorframes, attached to fork-lifts, hand-held, or even built into shelves to read RFID-tagged items. To read a plurality of RFID tags located in a general area, a plurality of RFID transceivers may be located throughout a controlled area, for example. Transceiver 114A also communicates with data processing equipment, such as processor 118. Processor 118 may comprise middleware to transform raw input data received from RFID tag 144, for example, into useful business data, for example.

In one embodiment, processor 118 may comprise one or more inputs 117A, B and at least one output 119, for example. First input 117A is connected to scanner 112 and second input 117B is connected to transceiver 114A. Processor 118 is adapted to communicate with nodes 120, 130 of system 100 through output 119 and connection 162. Inputs 117A, B may be adapted to transfer first and second item identification codes 142, 143 associated with item of merchandise 140. For example, input 117A may be adapted to transmit information associated with first item identification code 142 received by scanner 112 and input 117B may be adapted to transmit information associated with second item identification code 143 received by transceiver 114A, for example. At least one output 119 is connected to downstream elements of system 100, such as, for example, deactivation node 120 through connection 162. At least one output 119 may be adapted to communicate media and control information downstream of checkout flow area indicated by arrow 170 such as nodes 120, 130, for example. The information may take the form of analog or digital signals, electrical signals, a sequence of bits or bytes, for example, among other forms of information, formatted to exchange information between electrical equipment, processors, and/or computers located at nodes 110, 120, 130.

In operation, system 100 may correlate the information contained in first item identification code 142 and the information contained in second item identification code 143 associated with article of merchandise 140. System 100 processes the first and second item identification codes 142, 143 to determine whether an article of merchandise identified by first identification code 142 is the same as article of merchandise 140 identified by second identification 143. After correlation first and second codes 142, 143 on this basis, system 100 determines whether to activate or deactivate elements and/or nodes of system 100 on a real-time basis. For example, system 100 may control the activation or deactivation of EAS technology elements of system 100 based on the results of the correlation of first and second item identification codes 142, 143 to reduce occurrences of "sweet-hearting" type theft and exit system false alarms. The term sweet-hearting refers to employees discounting merchandise to their friends by partially ringing up a sale, ringing a sale with a much lower price and make it look like an "innocent" transaction. In one embodiment, processor 118 may process first item identification code 142 received from scanner 112 and second item identification code 143 received by transceiver 114A through inputs 117A and 117B, respectively, to control the operation of deactivation node 120. For example, whether or not to deactivate security label 146 when it is located in proximity of deactivation node 120. For example, processor 118 may process the information received from scanner 112 and transceiver 114A, and if there is a predetermined correlation between first and second item identification codes 142, 143, processor 118 transmits a signal to activate deactivation node 120 and deactivate security tag 146 to disable alarm 138 in detection node 130. In one embodiment, RFID transceiver 114A and scanner 112 may form an integral unit, shown generally at 116 for registering article of merchandise 140 into system 100.

In one embodiment, system 100 may include deactivation node 120, which may comprise an apparatus to deactivate security label 146 affixed to article of merchandise 140, for example. In one embodiment, deactivation node 120 may comprise an EAS deactivator, for example. Checkout node 110 may communicate correlated information associated with first and second item identification codes 142, 143 of article of merchandise 140 to deactivation node 120 by way of connection 162. Deactivation node 120 may use this correlated information to determine whether to deactivate security label 146 as it moves along the path indicated by arrow 170.

In one embodiment, deactivation node 120 also may comprise detacher/deactivator 122 operable to remove and deactivate security label 146 from article of merchandise 140, for example. In one embodiment, detacher/deactivator 122 may be located at the checkout counter or in proximity thereto. Detacher/deactivator 122 also may function as a data reader and writer with respect to security label 146. Connection 162 may provide a communication path between detacher/deactivator 122 and checkout node 110.

In one embodiment, deactivation node 120 also may comprise transceiver 114B to communicate information associated with second item identification code 143 between RFID tag 144. Transceiver 114B also may comprise an RFID transceiver, and may comprise substantially similar functionality as transceiver 114A. Connection 152 provides a wireless communication channel for transferring second item identification code 143 to deactivation node 120. Second item identification code 143, among other information, may be transferred between deactivation node 120 and checkout node 110 via communication connection 162, for example. In one embodiment, checkout node 110 and deactivation node 120 may form an integral unit 160, for example. In one embodiment, deactivation node 120 comprising RFID transceiver 114B, may be co-located with checkout node 110 in the purchasing transaction flow area or may be located remotely therefrom. In one embodiment, deactivation node 120 reads the presence of security label 146 as well as second item identification code 143 from RFID tag 144.

Checkout node 110 may combine scanning and deactivation functionality, shown generally as 160, for example. Other embodiments may be provided, however. For example, in one embodiment deactivation node 120 may be located after, but in-line with, the general direction indicated by arrow 170 of the checkout flow area in which article of merchandise 140 may be processed in system 100.

In one embodiment, system 100 may comprise a detection node 130 to detect the presence of a live or active security label 146. Detection node 130 equipment may include one or more antenna pedestals 132, 134 and receiver/detection electronics 136, and alarm 138, for example. In one embodiment, detection node 130 may comprise EAS detector equipment to form an EAS detection system. In one embodiment, detection node 130 may comprise a magneto-mechanical EAS system. Further, in one embodiment, system 100 may comprise elements of a combined article surveillance and article identification system and installed at a retail facility, for example. Detection equipment located at detection node 130 may be positioned near or at an exit/entrance location of a retail store, for example.

In one embodiment, detection node 130 also may comprise transceiver 114C to communicate with RFID tag 144 to transfer information associated with second item identification code 143. Transceiver 114C also may comprise an RFID transceiver, may provide substantially similar functionality as transceivers 114A, B. Second item identification code 143 may be transferred to detection node 130 via communication connection 154, which provides a wireless communication channel. RFID second item identification code 143 may be transferred to deactivation node 120 via communication channel 164, for example, and to checkout node 110 via communication channel 162, for example.

In one embodiment, first and second item identification codes 142, 143 and security label 146 information may be exchanged between checkout node 110, deactivation node 120, and detection node 130 on a real time basis, for example. Accordingly, in one embodiment, RFID transceiver 114A, B, C functionality may be integrated with any one of these nodes 110, 120, 130, and/or scanner 112. In one embodiment, second item identification code 143 may be transmitted to deactivation node 120 or detection node 130 during or upon completion of a checkout operation at checkout node 110, depending on the particular embodiment of system 100.

In one embodiment, system 100 may include one or more communication media 148, 150, 152, 154, 162, 164. Communication media 162, 164 may be used to communicate information between the various nodes of system 100, such as nodes 110, 120, 130. For example, communication media 162, 164 may comprise wired communication media, wireless communication media, or a combination of both, as desired for a given implementation. Communication media 148, 150, 152, 154 may be used to communicate information between the node 140 and nodes 110, 120, 130 of system 100. For example, communication media 148, 150, 152, 154 may comprise wired communication media, wireless communication media, or a combination of both, as desired for a given implementation. The embodiments are not limited in this context.

In one embodiment, system 100 may be implemented to prevent internal theft by employees, "sweet-hearting," false alarms, and to reduce labor affiliated with security label 146 transactions at nodes 110, 120, 130 and to reduce labor and cost affiliated with return transactions associated with articles of merchandise. This type of theft is difficult to detect. Retailers today consider internal theft and "sweet-hearting" to be among the largest percentage of loss.

To address employee theft, security label 146 may be linked to checkout node 110 (e.g., barcode scanners/readers) to prevent the deactivation of security label 146 until first item identification code 142 associated with the product has been scanned and read by scanner 112. This technique alone, however, does not correlate the scanned first item identification code 142 with security label 146 affixed to the product and there is no validation that first item identification code 142 corresponds to the article of merchandise 140 being purchased. Therefore, in a form of sweet-hearting, first item identification code 142 associated with a relatively inexpensive item may be fraudulently affixed to a much more expensive item, which is subsequently scanned and, presumably, allowing deactivation of security label 146 and permitting the purchaser to walk away with the expensive item without activating security label alarm 138.

Furthermore, currently there is no protection or prevention technique to eliminate false alarms. For example, when an EAS label is not properly deactivated it may trigger an alarm even though the customer paid for the product. Logs or databases may be kept to identify problem products that typically set off false alarms, and in some of these cases corrective actions may be taken such as discontinuing use of a security label on the product or implement special handling instructions. False alarms also may be triggered when a customer enters a retail store to return a product. A security label that is in an active state may be referred to as a live label. These live EAS labels entering a store (referred to as label pollution) with an EAS detection system will cause a false alarm. False alarms are a source of bad publicity for EAS customers, cause productivity slow-down and in some cases may prevent customer return business. This may result in decreased revenue.

Security label pollution also is a significant problem with today's EAS systems as a leading cause of false alarms. This is a situation where a product is purchased from a location without an EAS system, but that product is already "EAS ready," having been labeled most likely at a distributor of its production source. This process will eliminate "label pollution" false alarms.

The embodiments may solve these and other problems by correlating the RFID information read by RFID transceiver 114A (or 114B, C depending on the particular embodiment of system 100) with first item identification code 142 information, for example, and/or security label 146 information, for example. In one embodiment, system 100 may be used to implement in a checkout process, for example. Article of merchandise 140 comprising RFID tag 144 is presented to checkout node 110 of system 100. When the intent to purchase article of merchandise 140 is registered by scanner 112, RFID transceiver 114A reads the information associated with article of merchandise 140 and immediately (e.g., real-time) sends that information to the security label deactivation node 120 via connection 162 and to security label detection nod 130. In one embodiment, deactivation node 120 with RFID transceiver 114B, being co-located in the merchandise checkout flow area, also reads the presence of security label 146 and the RFID information associated with article of merchandise 140. If the RFID information matches that of an item that the scanner 112 registered during the current transaction, the deactivation node 120 deactivates security label 146, otherwise the deactivation node 120 is disabled at all times thus preventing "sweet-hearting." This will eliminate the need for searching individual products as well as having multiple security personnel at an exit system, reducing time and labor for the retailer.

System 100 comprising detection node 130 monitors exits of an enterprise, such as, for example, a retail enterprise. Upon article of merchandise 140 exiting the enterprise or leaving checkout node 110 area (wherever the exit system may be located), detection node 130 interrogates the signatures associated with security label 146 of article of merchandise 140. Should article of merchandise 140 still contain an active or live security label 146 signature detection node 130 will activate alarm 138. At that time, the person carrying article of merchandise 140 may present the purchase transaction receipt for article of merchandise 140 and the article itself to RFID transceiver 114C (or transceivers 114A, B, for example), which may be co-located with or in proximity of detection node 130. If the read ranges for RFID tag 144 and security label 146 technology are significantly different, article of merchandise 140 may be located in proximity to RFID transceiver 114C confirm the purchase of article of merchandise 140. If the read ranges of RFID tag 144 and security label 146 match or are close, detection node 130 interrogates RFID tag 144 simultaneously with security label 146, and does not activate alarm 138. System 100 then may compare the interrogation information of RFID tag 144 and security label 146 with information associated with article of merchandise 140 provided by scanner 112 to determine if the validity of the current purchase transaction. If alarm 138 was activated by detection node 130 on a live (e.g., non-deactivated) security label 146, but the purchase of the product is validated, the information associated with the failure to deactivate security label 146 may be provided to the scanner 112 or checkout node 110 so that appropriate corrective actions may be taken.

System 100 comprising detection node 130 monitors entrances of an enterprise, such as, for example, a retail enterprise. If an article of merchandise 140 enters the enterprise and detection node 130 detects a live security label 146, detection node 130 will activate alarm 138. Accordingly, the person carrying article of merchandise 140 may be located in proximity to RFID transceiver 114C. If the RFID signature (e.g., second identification code 143) indicates that article of merchandise 140 was not purchased at that particular retailer location, assistance can be rendered to deactivate the alarming product should this be an appropriate action. If the entrance detection node 130 alarmed on a live security label 146, but the purchase of article of merchandise 140 is validated, the information of the failure to deactivate security label 146 may be communicated to POS checkout node 110 so that appropriate actions may be taken.

System 100 comprising detection node 130 may be used to monitor entrances of an enterprise, such as, for example, a retail enterprise, to detect articles of merchandise crossing the retailer's entrance to transact a merchandise return process. Retailers utilize time and personnel during a return process. In addition, retailers may not be willing to process a return transaction for articles of merchandise purchased at a different retailer or different facility of the same retailer. A return process may comprise presenting article of merchandise 140 to RFID transceiver 114C to initiate a return transaction. Based on RFID information (e.g., second item information code 143), if article of merchandise 140 was validly purchased retailer's location, the person carrying article of merchandise 140 may be routed to an appropriate area for processing the return transaction or may receive credit for the return in a "self-checkout" process.

Figure 2:
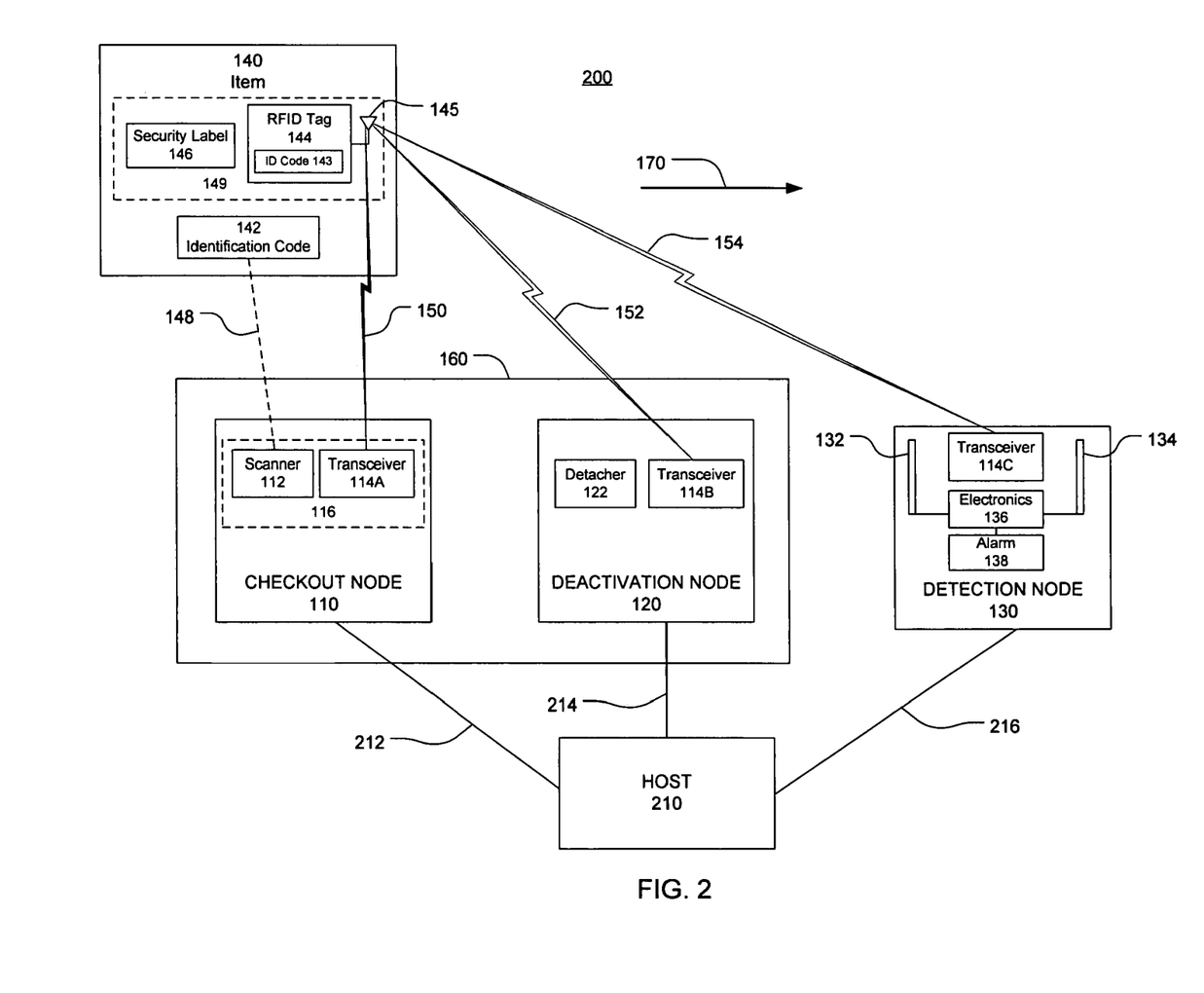
FIG. 2 illustrates a second block diagram of a system in accordance with one embodiment.

FIG. 2 illustrates a block diagram of a system 200. System 200 comprises the functionality according to system 100, discussed above with respect to FIG. 1. System 200, however, comprises central host computing node 210. Accordingly, checkout node 110 may communicate with host node 210 via connection 212. Deactivation node 120 may communicate with host node 210 via connection 214. Detection node 130 may communicate with host node 210 via connection 216. System 200 is suitable for use in accordance with the description of system 100 as previously described. The embodiments are not limited, however, to the example given in FIG. 2. In addition, host 210 may comprise the functionality of processor 118 and may be adapted to receive information associated with item of merchandise 140, such as, for example, first and second item identification codes 142, 143 and security label 146 information, among other information. Host 210 may be adapted to process this information and on that basis control the operation of nodes 110, 120, 130 and all elements comprising nodes 110, 120, 130, for example Referring to FIGS. 1 and 2, nodes 110, 120, 130, 140, and 210 of systems 100 and 200 each may comprise multiple elements. These elements may comprise, for example, a processor. The processor may be implemented as a general purpose processor, such as a general purpose processor made by Intel® Corporation, Santa Clara, Calif. In another example, the processor may include a dedicated processor, such as a controller, microcontroller, embedded processor, a digital signal processor (DSP), a field programmable gate array (FPGA), a programmable logic device (PLD), a network processor, an I/O processor, and so forth. The embodiments are not limited in this context.

In one embodiment, nodes 110, 120, 130, 140, and 210 of systems 100 and 200 each may comprise additional multiple elements. These additional elements may comprise memory. The memory may include any machine-readable or computer-readable media capable of storing data, including both volatile and non-volatile memory. For example, the memory may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

Furthermore, each of the elements comprising nodes 110, 120, 130, 140, and 210 of systems 100 and 200 as well as sub-elements 112, 114A, B, C, 122, 132, 134, 136, 138, 142, 144, 146 in accordance with one embodiment may comprise multiple elements. These elements may comprise, or be implemented as, one or more circuits, components, registers, processors, software subroutines, modules, or any combination thereof, as desired for a given set of design or performance constraints. Although FIGS. 1 and 2 show a limited number of elements by way of example, those skilled in the art will appreciate that additional or fewer elements may be used as desired for a given implementation. The embodiments are not limited in this context.

Operations of the above systems, nodes, apparatus, elements, and/or subsystems may be further described with reference to the following figures and accompanying examples. Some of the figures may include programming logic. Although such figures presented herein may include a particular programming logic, it can be appreciated that the programming logic merely provides an example of how the general functionality as described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 3:
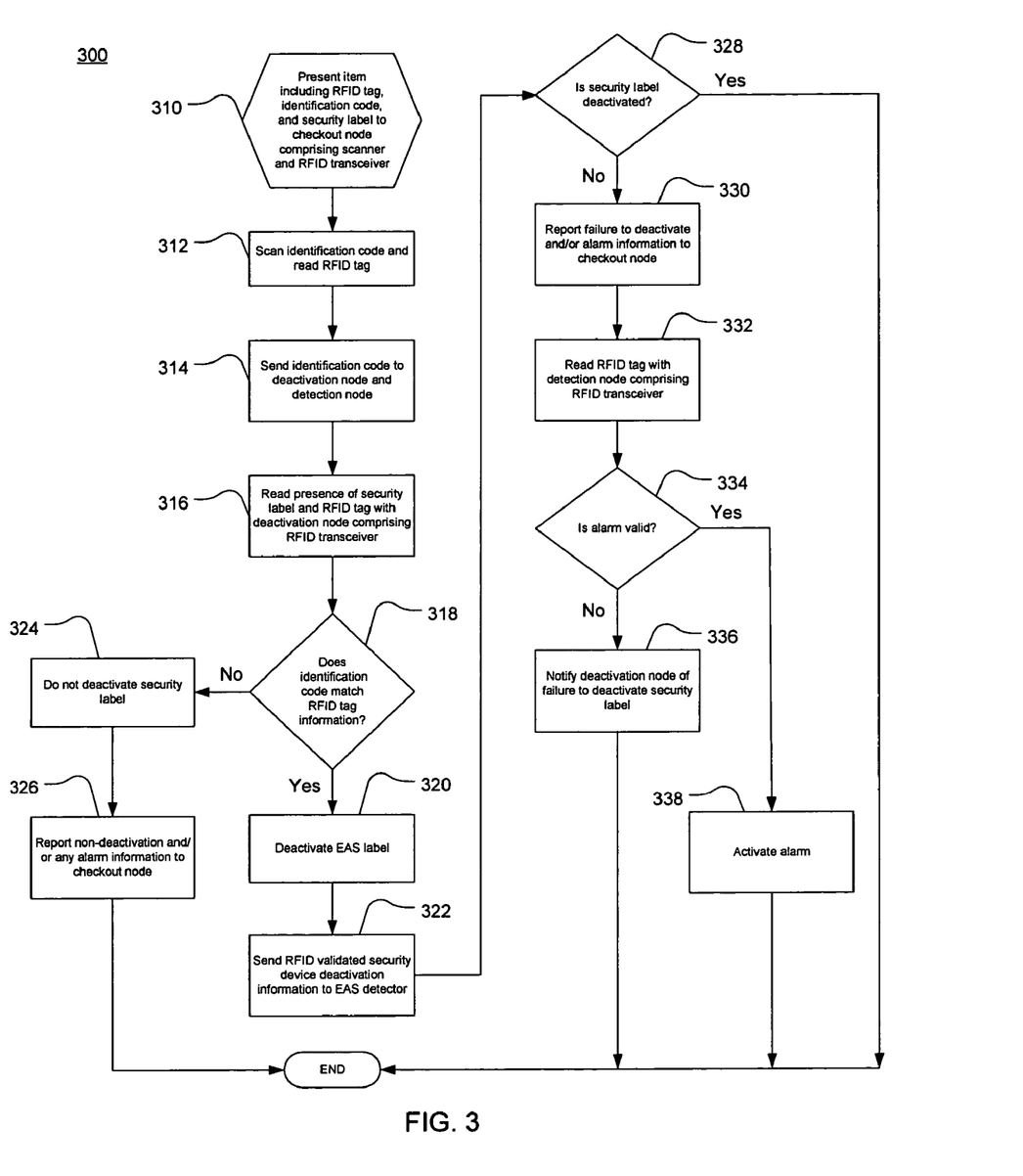
FIG. 3 illustrates a first logic diagram in accordance with one embodiment.

FIG. 3 illustrates a logic flow diagram representative of a checkout and/or exit process in accordance with one embodiment. In one embodiment, FIG. 3 may illustrate a programming logic 300. Programming logic 300 may be representative of the operations executed by one or more structures described herein, such as systems 100 and 200. For example, operations executed by nodes 110, 120, 130, 140, and 210 of systems 100 and 200 as well as sub-elements 112, 114A, B, C, 122, 132, 134, 136, 138, 142, 144, 146. As shown in diagram 300, the operation of the above described systems 100, 200 and associated programming logic may be better understood by way of example.

Accordingly, at block 310, an item such as article of merchandise 140 including an RFID tag 144, first item identification code 142, and security label 146 such as an EAS security label is presented to checkout node 110 comprising scanner 112 and RFID transceiver 114A. At block 312, system 100, 200 scans first item identification code 142 and reads RFID tag 144. At block 314, checkout node 110 sends first item identification code 142 to deactivation node 120 and detection node 130. At block 316, deactivation node 120 reads presence of security label 146. If deactivation node 120 comprises RFID transceiver 114B, it also reads RFID tag 144. Otherwise, RFID tag 144 information read at checkout node 110 is used.

At decision block 318, either checkout node 110 or deactivation node 120 determines whether first item identification code 142 matches RFID tag 144 information. If first item identification code 142 does not match the information associated with RFID tag 144, processing proceeds along the "no" branch to block 324 and deactivation node 120 does not deactivate security label 146. At block 326, deactivation node 120 reports the non-deactivation of security label 146 to checkout node 110. In one embodiment, deactivation node 120 also reports any alarm information to checkout node 110. If first item identification code 142 matches the information associated with RFID tag 144, processing proceeds along the "yes" branch to block 320 and deactivation node 120 deactivates security label 146. At block 322, deactivation node sends RFID tag 144 information to detection node 130.

At decision block 328, detection node 130 determines whether security label 146 has been successfully deactivated. If security label 146 has been deactivated, the process continues along the "yes" branch and the process terminates. Alternatively, if security label 146 has not been deactivated, the process continues along the "yes" branch and at block 330 detection node 130 reports the failure to deactivate and/or any alarm information to checkout node 110. If detection node 130 comprises RFID transceiver 11C, at block 332 transceiver 114C reads the RFID tag 146 information and at decision block 334, it determines whether the alarm is valid. If the alarm is not valid, the process continues along "no" branch and at block 336 deactivation node 120 is notified of the failure to deactivate security label 146. Otherwise, if the alarm is valid, the process continues along "yes" branch and at block 338, alarm 138 is activated and the process terminates.

Figure 4:
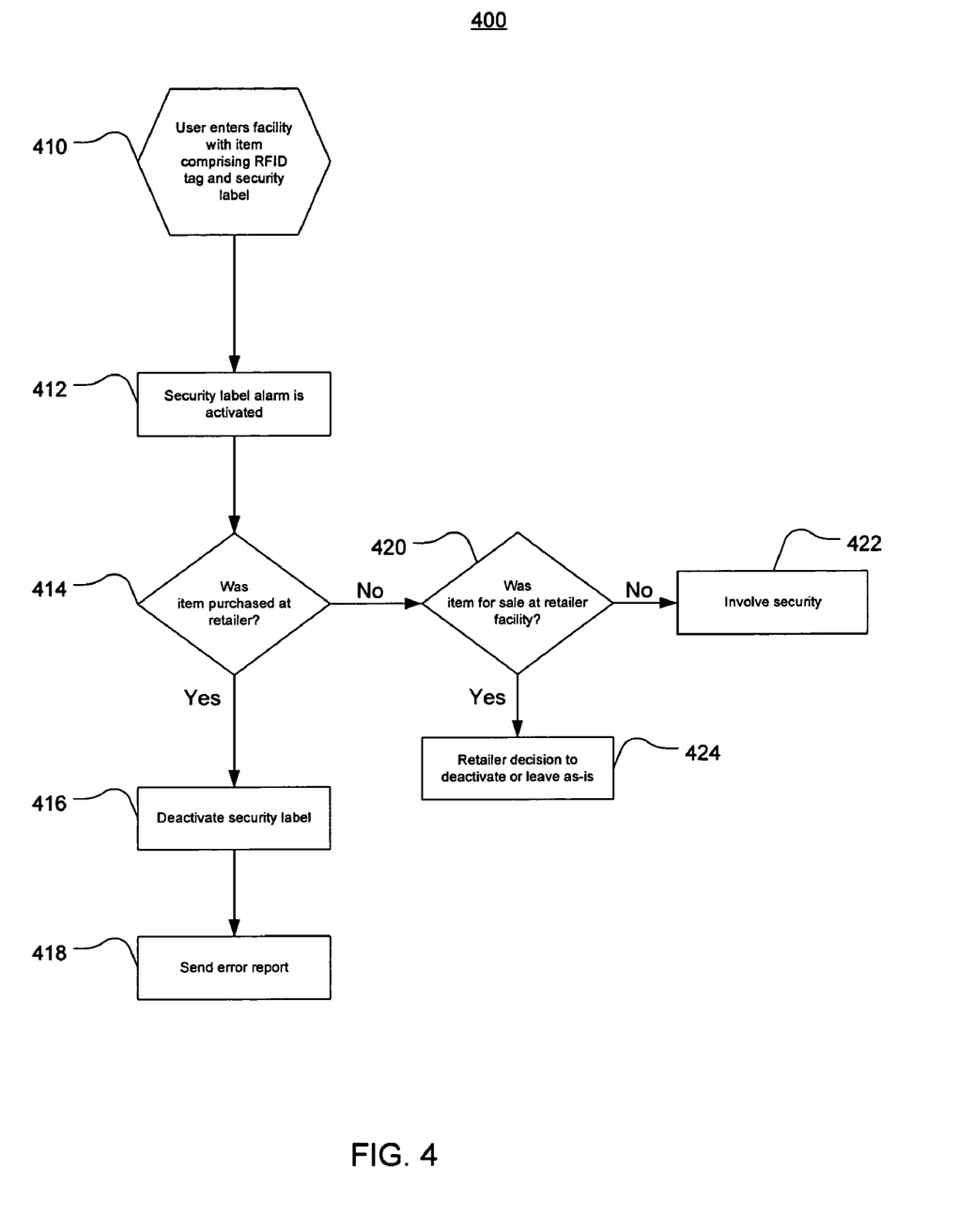
FIG. 4 illustrates a second logic diagram in accordance with one embodiment.

FIG. 4 illustrates a logic flow diagram representative of an entry process into a retail facility in accordance with one embodiment. In one embodiment, FIG. 4 may illustrate a programming logic 400. Programming logic 400 may be representative of the operations executed by one or more structures described herein, such as systems 100 and 200. For example, operations executed by nodes 110, 120, 130, 140, and 210 of systems 100 and 200 as well as sub-elements 112, 114A, B, C, 122, 132, 134, 136, 138, 142, 144, 146. As shown in diagram 400, the operation of the above described systems 100, 200 and associated programming logic may be better understood by way of example.

Accordingly, at block 410, a user enters a facility with an item comprising RFID tag 144 and security label 146. At block 412, detection node 130 activates alarm 138. At decision block 414, system 100, 200 determines whether the item was purchased at the retail facility. If the item was purchased at the retail facility, the process continues along the "yes" branch and security label 146 is deactivated at block 416. At block 418, an error report is sent to checkout node 110. If the item was not purchased at the retail facility, the process continues along the "no" branch and at decision block 420, system 100, 200 determines whether the item was offered for sale at the retail facility. If the item was offered for sale at the retail facility, processing continues along the "yes" branch and at block 424 the retailer decides whether to deactivate alarm 138. If the item was not offered for sale at the retail facility, processing continues along the "no" branch and at block 422 retail security personnel is involved in the transaction.

Figure 5:
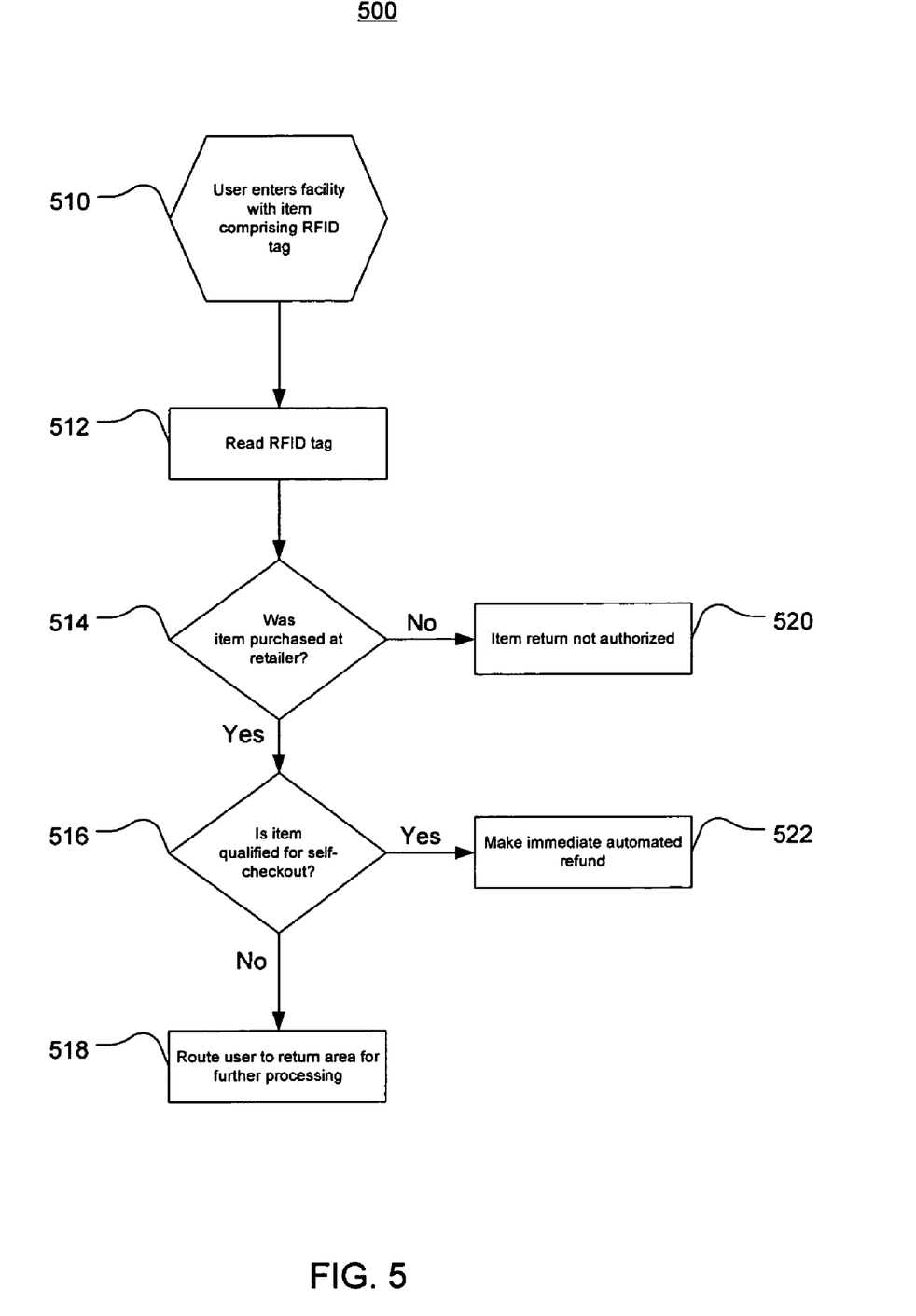
FIG. 5 illustrates a third logic diagram in accordance with one embodiment.

FIG. 5 illustrates a logic flow diagram representative of an item return process at a retail facility in accordance with one embodiment. In one embodiment, FIG. 5 may illustrate a programming logic 500. Programming logic 500 may be representative of the operations executed by one or more structures described herein, such as systems 100 and 200. For example, operations executed by nodes 110, 120, 130, 140, and 210 of systems 100 and 200 as well as sub-elements 112, 114A, B, C, 122, 132, 134, 136, 138, 142, 144, 146. As shown in diagram 500, the operation of the above described systems 100, 200 and associated programming logic may be better understood by way of example.

Accordingly, at block 510 a user enters a facility with an item comprising RFID tag 144 and security label 146. At block 512, detection node 130 reads RFID tag 144. At decision block 514, system 100, 200 determines whether the item was purchased at the retail facility. If the item was not purchased at the retail facility, the process continues along the "no" branch and at block 520 return authorization for the item is denied. If the item was purchased at the retail facility, the process continues along "yes" branch and at decision block 516, system 100, 200 determines if item is qualified for self-checkout. If item is qualified for self-checkout, the process continues along "yes" branch and at block 522 system 100, 200 may process an automatic refund. If item is not qualified for self-checkout, the process continues along "no" branch and at block 518 the user is routed to return area for further processing.

Figure 6:
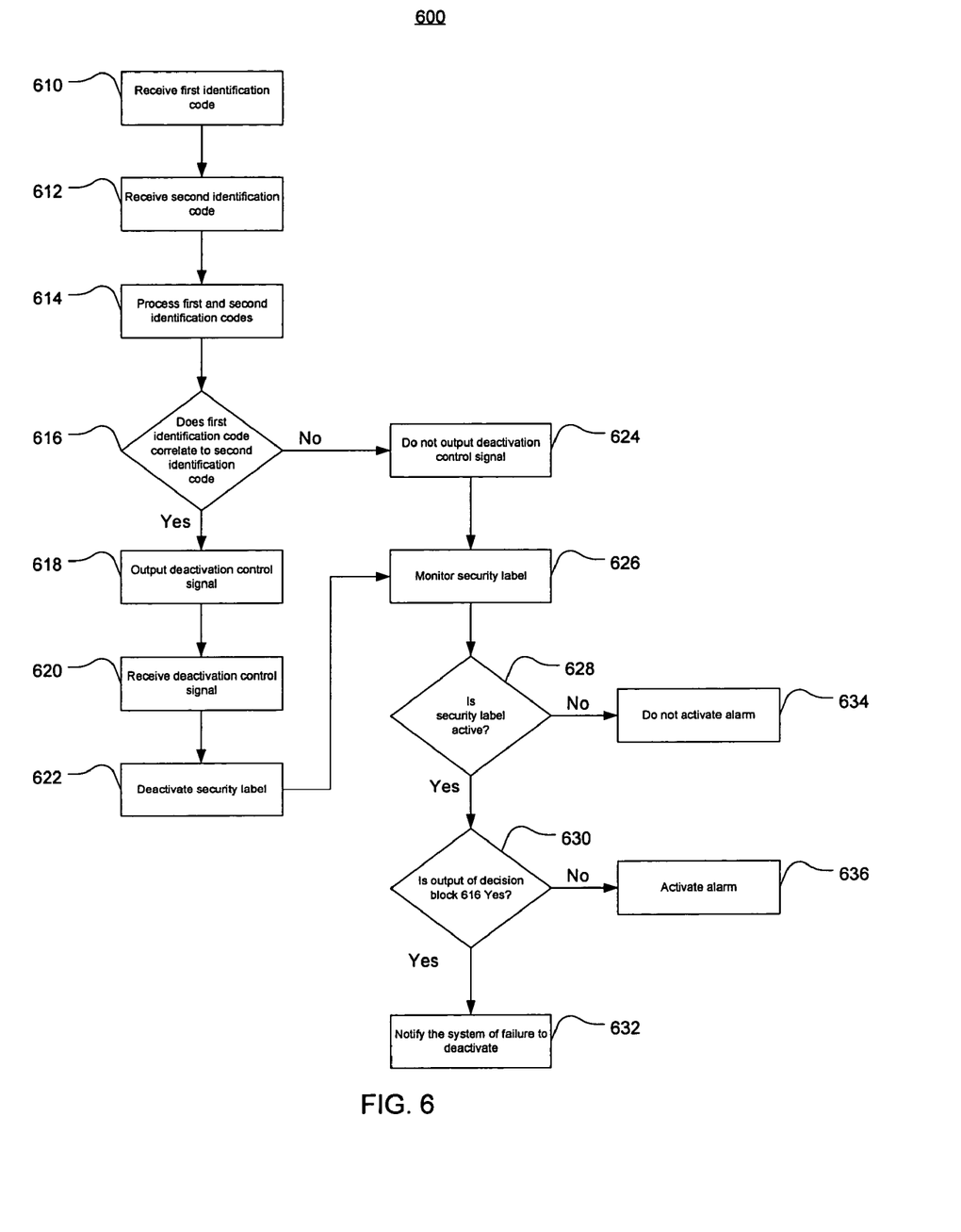
FIG. 6 illustrates a fourth logic diagram in accordance with one embodiment.

FIG. 6 illustrates a logic diagram in accordance with one embodiment. FIG. 6 illustrates a programming logic 600. Programming logic 600 may be representative of the operations executed by one or more structures described herein, such as systems 100 and 200. For example, operations executed by nodes 110, 120, 130, 140, and 210 of systems 100 and 200 as well as sub-elements 112, 114A, B, C, 122, 132, 134, 136, 138, 142, 144, 146. As shown in programming logic 600, at block 610 the system receives a first identification code associated with an item. At block 612 the system receives a second identification code associated with the item. At block 614, the system processes the first and second identification codes. At decision block 616, the system determines whether the first identification code correlates to the second identification code associated with the item. If there is a correlation between the codes, the process continues along "yes" branch and at block 618, a system module outputs a control signal to deactivate a security label. At block 620, another system module receives the control signal to deactivate the security label and at block 622 deactivates the security label. If there is no correlation between the codes, the process continues along "no" branch and at block 624, and no deactivation control signal is output. The process continues at block 626, where the system monitors the security label and at decision block 628 determines the activation status of the security label, e.g., whether the security label is still active. If the system determines that the security label is not active, the process continues along "no" branch to block 634 and does not activate the alarm. If, at block 628, the system determines that the label is still active, the process continues along "yes" branch to decision block 630. At decision block 630, the system determines whether the output of decision block 616 was "yes." In other words, it determines whether the first identification code correlates to the second identification code. If the first identification code correlates to the second identification code, the process continues along "yes" branch to block 632 and notifies the system of the failure to deactivate the security label. The alarm, however, is not activated. If, at decision block 630, the system determines that the output of decision block 616 was "no" and there is no correlation between the first and second identification codes, the system proceeds along "no" branch to block 636 and activates the alarm.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a first input to receive a first identification code associated with an item;
a second input to receive a second identification code associated with said item;
a third input to receive security label information;
an output to provide a control signal to control the operation of a security label deactivation device based on said first identification code, said second identification code and said security label information;
wherein the deactivation device is in communication with said output to receive said control signal and to deactivate said security label if said first identification code correlates to said second identification code; and
a detection device in communication with said deactivation device, said detection device to monitor said security label and to activate an alarm if said security label is live and if said first identification code does not correlate to said second identification code.

2. The apparatus of claim 1, further comprising a scanner to receive said first identification code, said scanner to provide said first identification code to said first input.

3. The apparatus of claim 1, further comprising a transceiver to receive said second identification code, said transceiver to provide said second identification code to said second input.

4. The apparatus of claim 1, further comprising a processor to receive said first and second identification codes associated with said item, said processor to process said first and second identification codes to provide said control signal to said output if said first identification code correlates to said second identification code.

5. A system, comprising:
an antenna;
a first input to receive a first identification code associated with an item;
a second input to receive a second identification code associated with said item;
a third input to receive security label information;
an output to provide a control signal to control the operation of a security label deactivation device based on said first identification code, said second identification code and said security label information;
wherein the deactivation device is in communication with said output to receive said control signal and to deactivate said security label if said first identification code correlates to said second identification code; and
a detection device in communication with said deactivation device, said detection device to monitor said security label and to activate an alarm if said security label is live and if said first identification code does not correlate to said second identification code.

6. The system of claim 5, further comprising a host computer in communication with said output, said host computer to provide said control signal to a security label detection device.

7. A method, comprising:
receiving a first identification code associated with an item;
receiving a second identification code associated with said item;
receiving security label information;
providing a control signal to control the operation of a security label deactivation device based on said first identification code, said second identification code and said security label information, wherein said security label is deactivated if said first identification code correlates to said second identification code;
monitoring said security label; and
activating an alarm if said security label is active, wherein activating said alarm comprises activating said alarm if said first identification code does not correlate to said second identification code.

8. The method of claim 7, further comprising: processing said first and second identification codes to determine whether said first identification code correlates to said second identification code associated with said item; and wherein, providing said control signal to said output comprises providing said control signal to said output if said first identification code correlates to said second identification code.

9. The method of claim 7, further comprising: receiving said control signal to deactivate said security label; and deactivating said security label if said first identification code correlates to said second identification code.

10. An article comprising a machine-readable storage medium containing instructions that if executed enable a system to:
receive a first identification code associated with an item;
receive a second identification code associated with said item;
receive security label information;
provide a control signal to control the operation of a security label deactivation device based on said first identification code, said second identification code and said security label information, wherein said security label is deactivated if said first identification code correlates to said second identification code;
monitor said security label; and
activate an alarm if said security label is active, wherein activating said alarm comprises activating said alarm if said first identification code does not correlate to said second identification code.

11. The article of claim 10, further comprising instructions that if executed enable the system to: process said first and second identification codes to determine whether said first identification code correlates to said second identification codes associated with said item; and wherein, to provide said control signal to said output, comprises provide said control signal to said output if said first identification code correlates to said second identification code.

12. The article of claim 10, further comprising instructions that if executed enable the system to: receive said control signal to deactivate said security label; and deactivate said security label if said first identification code correlates to said second identification code.

* * * * *